United States Patent
Sievers et al.

(10) Patent No.: US 9,541,061 B2
(45) Date of Patent: Jan. 10, 2017

(54) WIND TURBINE BLADE WITH VISCOELASTIC DAMPING

(71) Applicant: Siemens Energy, Inc., Orlando, FL (US)

(72) Inventors: Ryan A. Sievers, Lyons, CO (US); Justin L. Mullings, Golden, CO (US)

(73) Assignee: SIEMENS ENERGY, INC., Orlando, FL (US)

(*) Notice: Subject to any disclaimer, the term of this patent is extended or adjusted under 35 U.S.C. 154(b) by 396 days.

(21) Appl. No.: 14/195,935

(22) Filed: Mar. 4, 2014

(65) Prior Publication Data
US 2015/0252779 A1  Sep. 10, 2015

(51) Int. Cl.
F02C 7/04    (2006.01)
F03D 1/06    (2006.01)
F02C 7/045   (2006.01)

(52) U.S. Cl.
CPC .............. *F03D 1/0675* (2013.01); *F02C 7/045* (2013.01); *F05B 2260/964* (2013.01); *Y02E 10/721* (2013.01)

(58) Field of Classification Search
CPC ...... F01D 5/147; F01D 5/282; F05D 2260/96; F05D 2260/961; F05D 2300/501; F05D 2260/941; F05D 2300/603; F05D 2300/43; F02C 7/045; F04D 29/663; F04D 29/664; F04D 29/668
USPC ............... 416/229 R, 230, 500; 415/119
See application file for complete search history.

(56) References Cited

U.S. PATENT DOCUMENTS

| | | | |
|---|---|---|---|
| 3,388,772 A | 6/1968 | Marsh et al. | |
| 4,329,119 A | 5/1982 | Baskin | |
| 4,360,871 A | 11/1982 | Blaney | |
| 4,722,608 A * | 2/1988 | Salzman | B01F 7/00016 366/270 |
| 5,094,318 A | 3/1992 | Maeda et al. | |
| 5,356,264 A | 10/1994 | Watson et al. | |
| 6,626,642 B1 | 9/2003 | Veldkamp | |
| 7,296,766 B2 | 11/2007 | Drost | |
| 7,296,977 B2 | 11/2007 | Bonnet | |
| 7,811,063 B2 | 10/2010 | Bonnet | |
| 7,895,745 B2 | 3/2011 | Althoff et al. | |
| 7,942,637 B2 | 5/2011 | Akhtar et al. | |
| 7,988,416 B2 | 8/2011 | Westergaard | |
| 8,172,541 B2 * | 5/2012 | Cairo | F04D 29/023 416/229 R |
| 8,262,363 B2 * | 9/2012 | Gerber | F03D 1/0675 416/229 R |
| 8,500,410 B2 * | 8/2013 | De Moura | F01D 5/16 416/229 A |
| 2008/0107540 A1 | 5/2008 | Bonnet | |
| 2011/0031757 A1 | 2/2011 | Mitsuoka et al. | |

(Continued)

FOREIGN PATENT DOCUMENTS

| | | |
|---|---|---|
| FR | 2863319 A1 | 6/2005 |
| GB | 2473020 A | 3/2011 |
| WO | 2006122749 A1 | 11/2006 |

*Primary Examiner* — Matthew W Jellett

(57) ABSTRACT

A wind turbine blade (60) damped by viscoelastic material (54, 54A-F) sandwiched between stiffer load-bearing sub-layers (52A, 52B, 56A, 56B) in portions of the blade effective to damp oscillations (38) of the blade. The viscoelastic material may be located in one or more of: a forward portion (54A) of the shell, an aft portion (54D) of the shell, pressure and suction side end caps (54B) of an internal spar, internal webbing walls (54C, 54E), and a trailing edge core (54F).

17 Claims, 3 Drawing Sheets

(56) References Cited

U.S. PATENT DOCUMENTS

2011/0142679 A1 6/2011 Bendel et al.
2011/0182730 A1 7/2011 Link
2012/0034833 A1 2/2012 Schaube

* cited by examiner

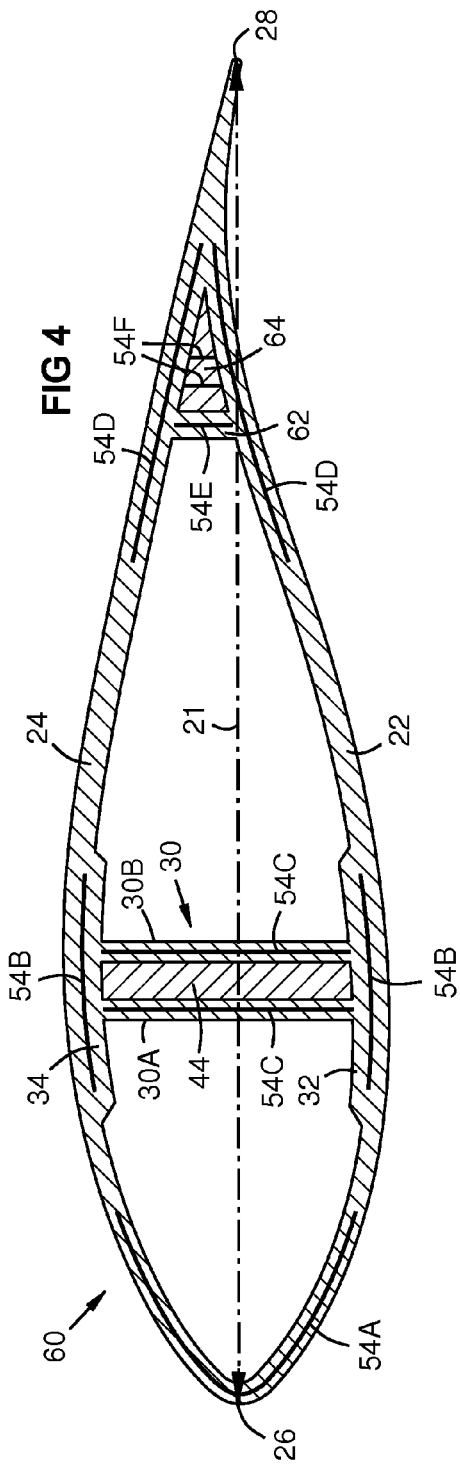
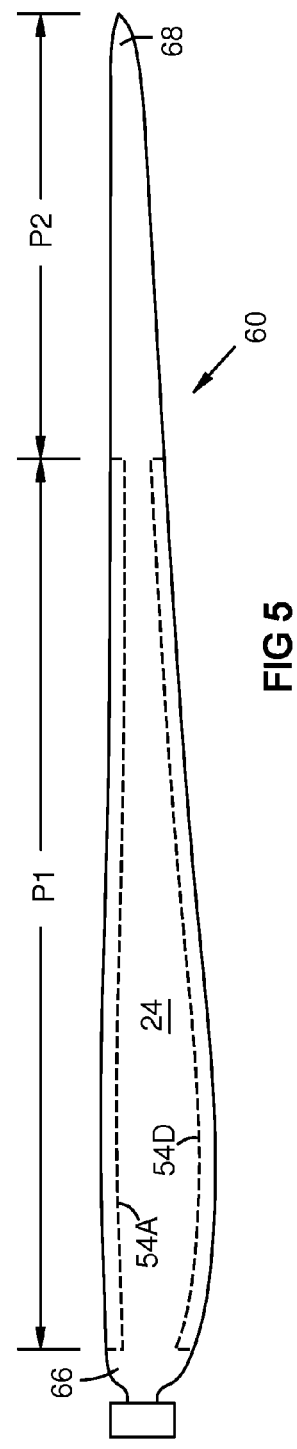

WIND TURBINE BLADE WITH VISCOELASTIC DAMPING

STATEMENT REGARDING FEDERALLY SPONSORED DEVELOPMENT

Development for this invention was supported in part by Contract No. DE-EE0005493 awarded by the United States Department of Energy. Accordingly, the United States Government may have certain rights in this invention.

FIELD OF THE INVENTION

The invention relates generally to wind turbines and to dampers for oscillations in wind turbine blades, and more particularly to a wind turbine blade incorporating viscoelastic damping material.

BACKGROUND OF THE INVENTION

Wind turbine blades are being made larger for improved economic efficiency. As blade size increases, structural requirements increase to support the greater mass. Additional structural mass results in greater gravitational and centrifugal loads, requiring still more structure in a cascading fashion. Blade designs can devote the majority of their structural strength simply to support the mass of the blade. Due to scaling laws, maximum producible turbine size is limited by this problem. Increased blade mass requires increased mass in all the turbine and tower structural components. So this problem is a large contributor to total turbine cost.

Damping of wind turbine blades is often low due to the natural properties of the materials of construction of the blades. Aerodynamic damping is effective for flapwise loads only. "Flapwise" means perpendicular to the chord and the span of the blade, such as in the direction 36 in FIG. 1. Edgewise loads include gravitational loads and dynamic loads from oscillations. "Edgewise" means parallel to the chord of the blade, such as in the direction 38 of FIG. 1. Edgewise oscillations are minimally damped, as they depend completely on the low levels of material damping. Therefore, edgewise loads due to oscillations are difficult to reduce. They contribute significantly to the total loads.

BRIEF DESCRIPTION OF THE DRAWINGS

The invention is explained in the following description in view of the drawings that show:

FIG. 4 is a transverse sectional view of a wind turbine blade showing examples of locations for viscoelastic damping in accordance with aspects of the invention.

FIG. 5 is a suction side view of a wind turbine blade showing examples of spanwise extents of viscoelastic damping in accordance with aspects of the invention.

DETAILED DESCRIPTION OF THE INVENTION

The inventors have recognized that effective edgewise damping would substantially reduce maximum edgewise blade loads, and therefore reduce the structural mass requirements of large wind turbine blades. They devised a damping apparatus using a viscoelastic material constrained between stiff layers forming the shell and/or other structural walls of the blade. As such a structure bends, the viscoelastic material is put into a state of shear in which it dissipates energy by hysteresis, and provides damping to the motion of the structure. Such energy dissipation enables a reduction in the structural mass of the blade, which in turn permits larger blade designs and/or reduced size/strength/cost of other structures of the wind turbine.

Figure 1:
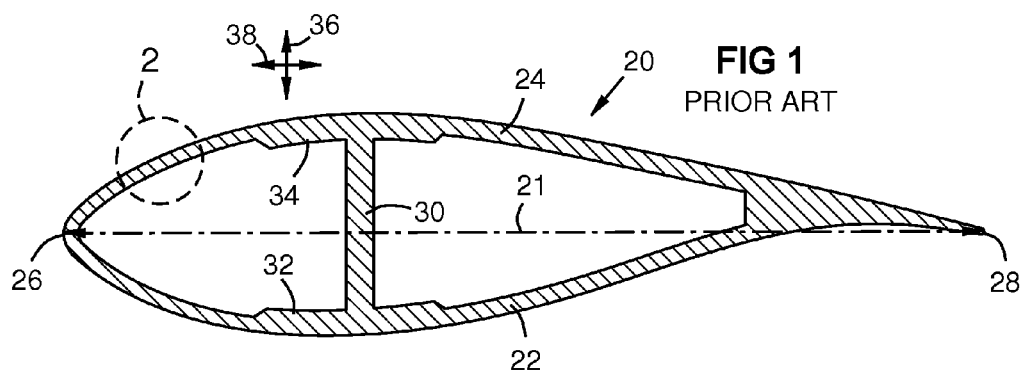
FIG. 1 is a transverse sectional view of a prior art wind turbine blade.

FIG. 1 is a transverse sectional view of a wind turbine blade 20 with a chord line 21. It has a pressure side 22 and an opposed suction side 24, both sides extending between a leading edge 26 and a trailing edge 28, thus forming an aerodynamic shell 22, 24, 26, 28. A transverse webbing wall 30 spans between the pressure and suction sides. This may take the form of an I-beam spar with pressure and suction side end caps 32, 34. The webbing wall 30 mainly opposes flapwise loads 36. The outer wall or shell 22, 24, 26, 28 of the airfoil and the spar end caps 32, 34 oppose edgewise loads 38.

Figure 2:
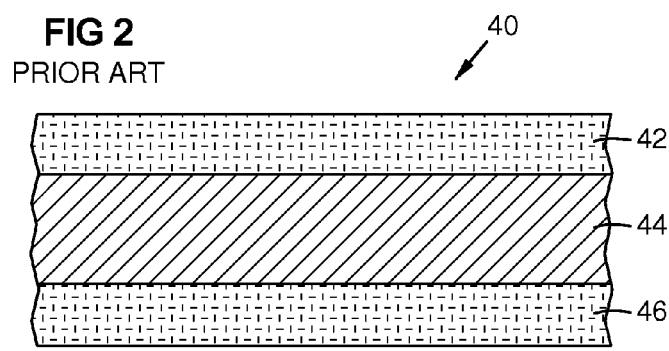
FIG. 2 is an enlarged sectional view of a portion of the blade shell of FIG. 1.

FIG. 2 is an enlarged sectional view of a portion of the airfoil shell of FIG. 1, illustrating a prior sandwich shell construction 40 with a core 44 made of a different material than the load bearing layers 42, 48. The core material may have a lower density than the adjoining load bearing layers. Herein "low-density" referring a core material means lower density than adjoining load-bearing layers. For example balsa or structural foam may be sandwiched between two load-bearing layers 42, 46, where the load bearing layers are made of a denser material such as a polymer reinforced with glass, carbon, or other fibers. A lower density core is beneficial in reducing weight for a given strength requirement.

Figure 3:
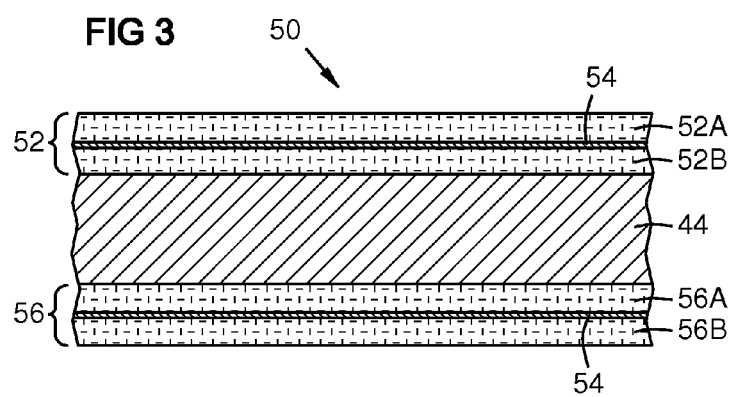
FIG. 3 is a sectional view of a portion of a wind turbine blade shell with viscoelastic sublayers in accordance with aspects of the invention.

FIG. 3 is sectional view of a portion of an airfoil shell showing an embodiment 50 of the invention. At least one of the primary load-bearing layers 52, 56 includes a sublayer 54 of viscoelastic damping material. The outer load bearing layer 52 may have a sublayer 54 of viscoelastic material sandwiched between stiffer load bearing sublayers 52A, 52B. The inner load bearing layer 56 may have a sublayer 54 of viscoelastic material sandwiched between stiffer load bearing sublayers 56A, 56B. The load-bearing sublayers may have an elastic modulus at least 10 times greater than that of the viscoelastic layer, and in other embodiments more than 50 times or more than 100 times greater. In fabricating the blade, the viscoelastic material may be placed between sheets of glass fibers during lay-up to be cast together to form the blade to include the viscoelastic material as an integral part of the blade structure. This means that the viscoelastic material is formed in full and direct contact with the respective load-bearing layers. Prior art applications of damping material to wind turbine blades, such as described in U.S. Pat. No. 7,811,063, have relied upon an additional adhesive material to connect a viscoelastic material to a surface of the blade. Such designs are subject to blade failure in the event of degradation or detachment of the adhesive material or the bond interfaces thereof. The present invention captures the sublayer 43 of viscoelastic damping material between load bearing layers 52A, 52B, 56A, 56B. This enhances performance of the energy absorbing function of the damping material, and greatly reduces the likelihood of failure due to loss of adhesion, because the damping material is constrained by the structural layers. It eliminates the chance of failure of additional adhesive material or the bond interfaces thereof.

The bond quality between the damping material and load-bearing layers is vastly improved using this approach, in which the viscoelastic material is integral to the casting process. The inventor discovered through experiments that the bond quality for a viscoelastic layer is poor using adhesives to bond the viscoelastic material to pre-cast fiberglass panels. The actual bond area may be much less than the total surface area, which reduces or ruins the viscoelastic damping effect. Furthermore, the present invention does not required additional mass for constraining the viscoelastic material beyond the optimum mass for the blade load-bearing structure, so it does not add substantial weight or any weight beyond that of the viscoelastic material itself.

In prior blade fabrication, glass fabric layers are placed in a horizontally oriented suction-side mold. A mandrel representing the internal void geometry of the blade is placed on the suction side layup. The fabric is then wrapped around the leading edge and suction side of the mandrel, and meets itself at the trailing edge. This makes a closed C-shaped layup with one seam at the trailing edge. A pressure side mold cover is then closed over the layup. A vacuum bag around the mandrel is deflated to push the layup against the interior of the mold. The fabric is infused with a matrix material such as an epoxy or thermosetting polymer. In the present invention, the viscoelastic sublayers are placed between glass fabric layers in the original layup. This integrates them into the shell and other structures of the blade without the need for additional adhesive layers, thus making the shear properties more uniform in the viscoelastic layers. Other fabrication processes such as wet layup with pre-impregnated fiber sheets may be used to integrate the viscoelastic sublayers into the blade load-bearing structure.

Figure 6:
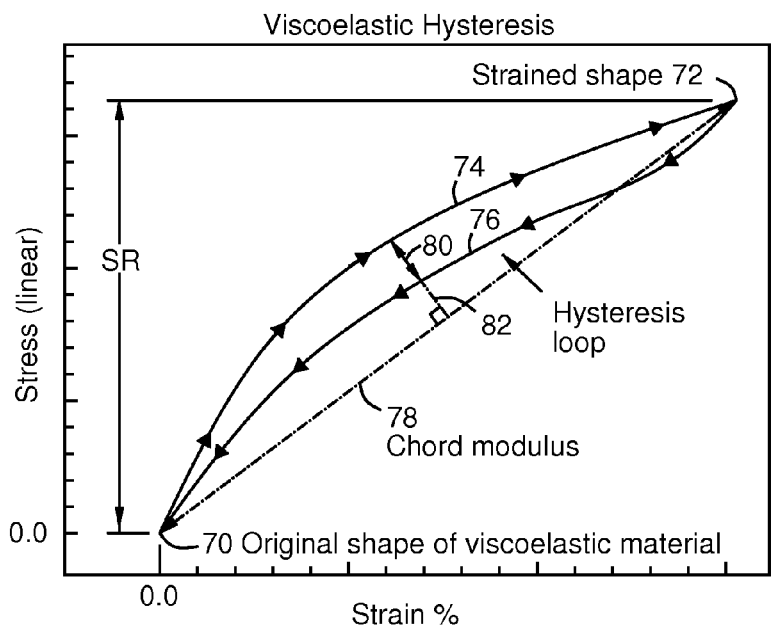
FIG. 6 shows a hysteresis loop exhibited by a viscoelastic material.

Viscoelastic materials exhibit both elasticity and viscosity. They creep under time-dependent strain, while absorbing energy and converting it to heat. However, they return to their original shape in a hysteresis loop upon release of the stress. Although the molecules of the material are rearranged under stress with time, they accumulate back-stresses that cause the material to return to its original shape, absorbing heat during the rebound. Elastomers are useful for the viscoelastic material of the present invention. Viscoelastic materials with an elastic modulus of less than 1 GPa including elastomers in a range such as 0.001 to 0.1 GPa may be useful. Since stress/strain is non-linear in viscoelastic materials, the term "elastic modulus" herein means the average stress/strain over the design stress range, as illustrated in FIG. 6. This is the same as the secant modulus of elasticity at the maximum design stress starting from zero stress or the chord modulus between the end points of the design stress range as described in international standard ASTM E111-04(2010). The table below gives examples of materials for the load-bearing sublayers (a), the core (b), and the viscoelastic material (c).

|   | Material | Elastic Modulus (GPa) |
|---|---|---|
| a. | Glass reinforced polyester matrix | 17 |
| b. | Balsa wood | 3.3 |
| c. | Silicone rubber | 0.001-0.05 |

FIG. 4 is a transverse sectional view of a wind turbine blade 60 showing some exemplary locations for the damping material. It may be provided as a viscoelastic layer in a single load-bearing layer or in parallel load-bearing layers that sandwich a core as shown in FIG. 3. The damping material may be provided in one or more locations as indicated by the following reference numeral:

54A—In a leading portion of the shell, such as covering a leading 10% or more of the chord length 21 of the airfoil.
54B—In the end caps 32, 34 of the spar.
54C—In a transverse webbing wall 30 of the spar.
54D—In a trailing portion of the shell, such as covering a trailing 10% or more of the chord length of the airfoil.
54E—In a transverse webbing wall 62 of the trailing edge.
54F—In a core portion 64 of the trailing edge.

The viscoelastic material 54 experiences significant operational shear. Locations 54A, 54B, 54D, 54E, and 54F and other locations in the shell are particularly effective in damping edgewise oscillations, and thus reducing maximum edgewise loading and structural requirements.

In one embodiment, the transverse webbing wall 30 of the spar may include first and second load-bearing subwalls 30A, 30B extending between the pressure side 22 and the suction side 24 of the shell. Each load-bearing subwall may be formed with a viscoelastic material integrally sandwiched between first and second load-bearing sublayers as in FIG. 3 without adhesive or gaps. Gaps and adhesive can cause stress concentrations at the edges of the viscoelastic material, resulting in separation. A core 44 of a different material than the load-bearing layers, for example a material that is less dense than the load-bearing layers, may be sandwiched between the load-bearing subwalls 30A, 30B, as illustrated in FIG. 4. A layer 54B of the viscoelastic material may be integrally sandwiched in each end cap 32, 34 parallel to the respective pressure and suction sides of the shell.

FIG. 5 shows a non-limiting example of a spanwise arrangement for the damping material locations 54A and 54D. They may cover at least ⅓ or at least ½ of the span as shown by P1 for example, while a second portion P2 may remain undamped by a viscoelastic layer of the invention. In the example of FIG. 5 the inboard majority of the span of blade 60 is damped, and the outboard minority is undamped.

Optionally, the viscoelastic properties of the damping material may be varied over the blade in proportion to variations in shear on different portions of the blade. For example the damping material may be less elastic inboard toward the root 66 and more elastic outboard toward the tip 68 of the blade, providing a stepwise or smooth gradient of elasticity over a damped span of the blade. This arrangement can unify damping over the span of the blade and avoid excessive strain in portions of the damping material and/or the adjoining load-bearing layers. For example the elastic modulus of the viscoelastic materials may decrease from about 0.1 GPa inboard to 0.02 GPa or 0.01 GPa or 0.001 GPa outboard in some embodiments using a stepwise sequence or a smooth gradient of selected viscoelastic materials. For example, the elastic modulus of the damping material may vary with the bending moment over a damped span of the blade.

FIG. 6 shows a hysteresis loop exhibited by a viscoelastic material on a stress/strain graph with linear/linear units. Within a design stress range SR (in units of GPa for example), the subject material starts at a beginning shape 70 and reaches a relatively distorted shape 72 along a first stress/strain curve 74. Upon removal of the stress, the material returns to its beginning shape along a different stress/strain curve 76. An average modulus of elasticity may be described as the slope of a line 78 between the beginning and end points 70, 72—in other words, the secant modulus of elasticity at the maximum design stress when starting from zero stress or the chord modulus of elasticity over any design stress range. A magnitude of hysteresis may be described as the separation 80 between the two stress/strain curves 74, 76, taken along a perpendicular from a midpoint of chord modulus of elasticity line 78, divided by the distance 78 between the beginning and ending points 70, 72.

Figure 7:
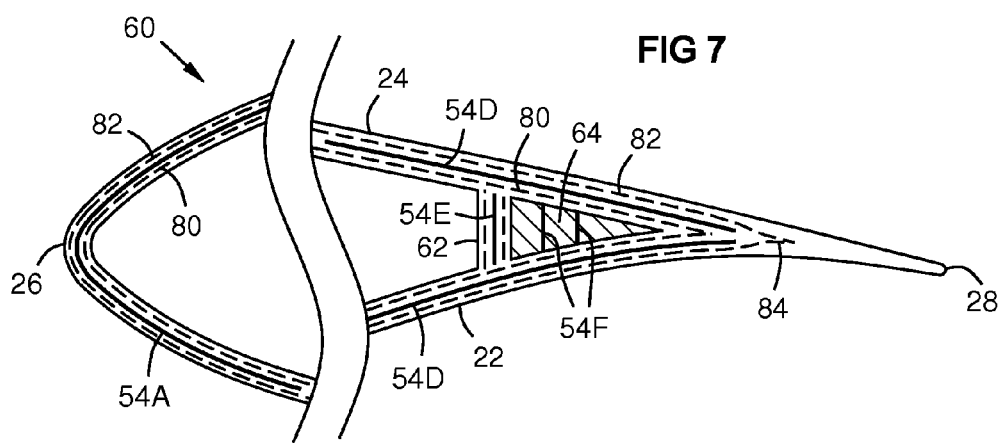
FIG. 7 illustrates fabrication of a blade shell with fiber sheets.

FIG. 7 illustrates details of a fabrication of a wind turbine blade shell as in FIG. 4 with fiber sheets 80, 82 that may wrap continuously beginning from the trailing edge 28, around the pressure side 22, the leading edge 26 and the suction side 24 in a C-shaped layup that is joined 84 at the trailing edge 28. Damping material is included in the structure as described above. An aft transverse webbing wall 62 encloses an aft chamber between the pressure 22 and suction 24 sides and the trailing edge 28. A core 64 of a different material from the load-bearing walls, for example a material of lower density than the load-bearing material, is disposed in the aft chamber sandwiching a further layer or layers 54F of viscoelastic material oriented transversely to the chord length.

Preliminary studies of the effect of damping as taught herein indicate that load reductions from 10-30% are possible, which may dramatically change the way blades are designed and manufactured, resulting in significant cost savings and enabling larger blades than are possible with current technology. This can be used to reduce the mass and cost of not only the blades, but of the entire turbine structure. It can also allow greatly increased rotor diameters, leading to decreased cost of energy and a competitive advantage.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims

The invention claimed is:

1. A wind turbine blade comprising:
   an airfoil shell comprising a suction side and an opposed pressure side, both sides extending between a leading edge and a trailing edge;
   a viscoelastic sublayer comprising a viscoelastic material integrally sandwiched between first and second load-bearing sublayers in a first portion of the shell, the load-bearing sublayers comprising a material having a modulus of elasticity at least 10 times greater than an average modulus of elasticity of the viscoelastic material,
   further comprising an aft transverse webbing wall of load-bearing material spanning between the pressure and suction sides within an aft 30% of a chord length of the shell; and a layer of viscoelastic material integrally sandwiched within the aft transverse webbing wall and oriented transversely to the chord length of the shell, and
   wherein the aft transverse webbing wall encloses an aft chamber between the pressure and suction sides and the trailing edge; and further comprising a core in the aft chamber and a further layer of the viscoelastic material in the core oriented transversely to the chord length, wherein the core has a lower density than the load-bearing material.

2. The wind turbine blade of claim 1, wherein the load-bearing sublayers comprise a polymer reinforced with glass fibers; and the viscoelastic material comprises an elastomeric polymer that is in full and direct contact with the load-bearing sublayers without an additional adhesive layer there between.

3. The wind turbine blade of claim 1, wherein the load-bearing sublayers comprise fabric sheets of glass fibers, and each sheet is continuous from the trailing edge, over the pressure side, the leading edge, and the suction side of the shell in a closed C-shaped layup meeting in a seam at the trailing edge.

4. The wind turbine blade of claim 1, wherein said first portion of the shell further comprises a second viscoelastic sublayer integrally sandwiched between third and fourth load-bearing sublayers; and a core layer having a density lower than the load-bearing sublayers sandwiched between the second and third load-bearing sublayers.

5. The wind turbine blade of claim 1, wherein said first portion of the shell extends over at least a forward 10% of a chord length of the shell and over at least ⅓ of a spanwise portion of the blade.

6. The wind turbine blade of claim 1, wherein said first portion of the shell extends over at least an aft 10% of a chord length of the shell and over at least ⅓ of a spanwise portion of the blade.

7. The wind turbine blade of claim 1, further comprising a spanwise internal spar comprising a transverse webbing wall of the load-bearing material extending between the pressure and suction sides of the shell; and a layer of the viscoelastic material integrally sandwiched within first and second end caps of the transverse webbing wall on the pressure and suction sides of the shell respectively and parallel to the pressure and suction sides respectively.

8. The wind turbine blade of claim 1, further comprising a spanwise internal spar comprising a transverse webbing wall extending between the pressure and suction sides of the shell; the webbing wall comprising first and second load-bearing walls, each wall comprising the viscoelastic material integrally sandwiched between first and second load-bearing sub-walls of the load-bearing material without additional adhesive layers or gaps therebetween; and further comprising a core material less dense than the load-bearing material sandwiched between the first and second load-bearing walls.

9. The wind turbine blade of claim 1, wherein said first portion of the shell extends over a spanwise length of the blade, and the average elastic modulus of the viscoelastic material is greater inboard and lesser outboard over the spanwise length.

10. The wind turbine blade of claim 1, wherein the load-bearing sublayers comprise a material having a modulus of elasticity at least 100 times greater than an average modulus of elasticity of the viscoelastic material.

11. A wind turbine blade comprising:
    an airfoil shell comprising a pressure side and an opposed suction side, wherein both sides extend between a leading edge and a trailing edge;
    the shell comprising a low density core material sandwiched between higher density exterior and interior load-bearing layers comprising glass fabric reinforcement sheets that are continuous from the trailing edge, over the pressure side, the leading edge, and the suction side, and joined at the trailing edge, the exterior load-bearing layer forming an aerodynamic surface of the airfoil shell; and
    wherein a portion of the shell comprises a viscoelastic shear layer comprising a viscoelastic material integrally sandwiched between first and second load-bearing sublayers of at least one of the load-bearing layers, wherein the load-bearing sublayers are made of a material with at least 100 times greater modulus of elasticity than an average modulus of elasticity of the viscoelastic material over a design stress range of the viscoelastic material.

12. The wind turbine blade of claim 11, wherein the load-bearing sublayers are made of a polymer reinforced with glass fibers; and the viscoelastic material comprises an elastomeric polymer that is in full and direct contact with the first and second load-bearing sublayers without gaps or additional adhesive material there between.

13. The wind turbine blade of claim 11, wherein a first one of said portions of the shell extends over at least a forward 10% of a chord length of the shell and over at least ⅓ of a spanwise portion of the blade.

14. The wind turbine blade of claim 13, wherein a second one of said portions of the shell extends over at least an aft 10% of a chord length of the shell and over at least ⅓ of the spanwise portion of the blade.

15. The wind turbine blade of claim 11, further comprising an aft transverse webbing wall extending between the pressure and suction sides within an aft 30% of a chord length of the shell, and a transverse layer of the viscoelastic material integrally formed within the aft transverse webbing wall and oriented transversely to the chord length.

16. The wind turbine blade of claim 15, wherein the aft transverse webbing wall encloses an aft chamber between the pressure and suction sides and the trailing edge; and further comprising a low-density core in the aft chamber and an additional transverse layer of the viscoelastic material in the core oriented transversely to the chord length, wherein the low-density core has a lower density than the aft transverse webbing wall.

17. The wind turbine blade of claim 11, further comprising:
a spanwise internal spar comprising a transverse webbing wall of the load-bearing material extending between the pressure and suction sides of the shell;
first and second end caps on the spar on the pressure and suction sides of the shell respectively; and
a further viscoelastic shear layer integrally sandwiched in each of the end caps parallel to the pressure and suction sides respectively.

* * * * *